Feb. 23, 1926.  
H. HARRIS  
1,573,829  
APPARATUS FOR REFINING OR SEPARATING METALS  
Filed Dec. 8, 1922
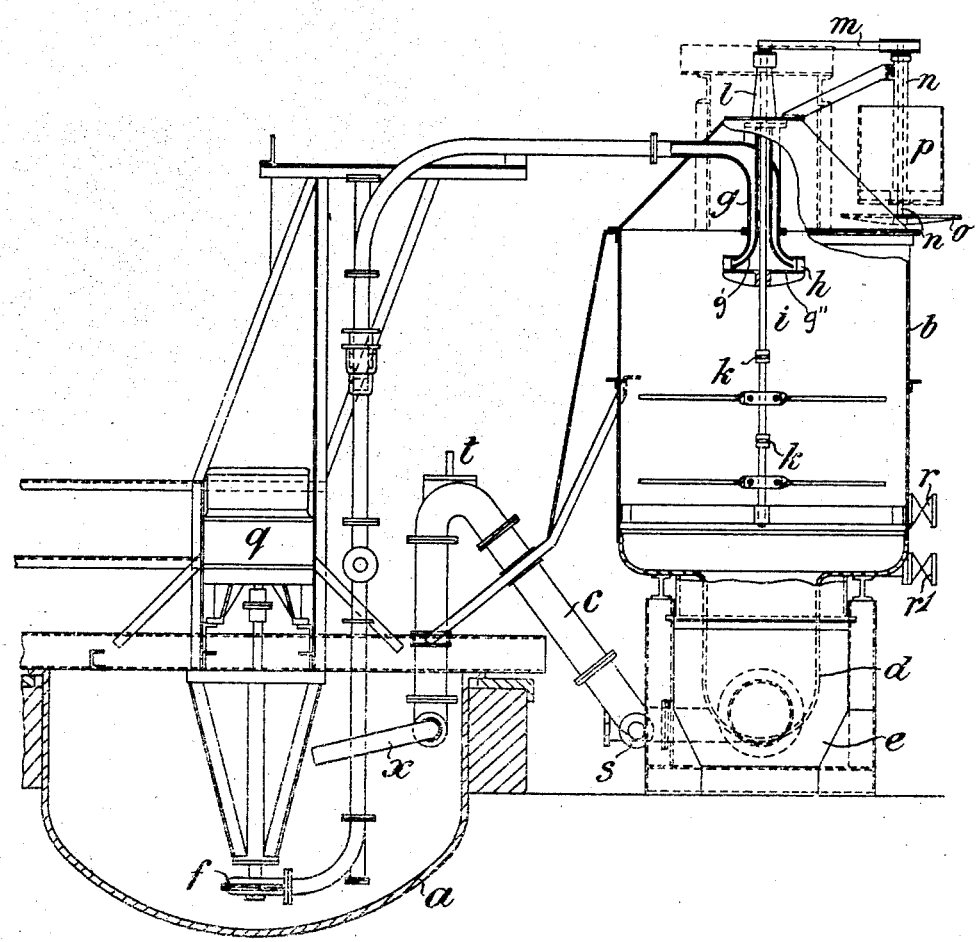
Inventor.  
Henry Harris  
By  
Attorney Patented Feb. 23, 1926.

1,573,829

UNITED STATES PATENT OFFICE.

HENRY HARRIS, OF LONDON, ENGLAND.

APPARATUS FOR REFINING OR SEPARATING METALS.

Application filed December 8, 1922. Serial No. 605,597.

*To all whom it may concern:*

Be it known that I, HENRY HARRIS, a subject of the King of Great Britain, residing in London, England, have invented certain new and useful Improvements in Apparatus for Refining or Separating Metals, of which the following is a specification.

My invention relates to improvements in apparatus for refining or separating metals. One of the objects of the invention is to provide apparatus for this purpose arranged and constructed so as to be adapted particularly for relatively large units or for treating relatively large quantities of molten metal in a simple and efficient manner. The apparatus in its preferred embodiment is particularly adapted for carrying out a process of treating the metal wherein the molten metal is caused to continuously circulate through a molten reagent contained in a reagent container into which the molten metal is discharged in distributed form, and a suitable reagent is gradually fed to the reagent container during the reactions.

The invention includes among its features a stationary reagent container alongside of the melting pot, located either below or above the level of the melting pot and having means forming a liquid seal at its lower end; a turbine driven by the circulating molten metal and used to perform one or more desired functions in connection with the operation, and means for automatically gradually feeding a reagent material to the reagent container at a predetermined rate during the reaction.

The invention consists in the novel features, arrangement, construction and combination of parts hereinafter described according to the preferred embodiment thereof for the purpose of treating molten lead. The invention will be more particularly pointed out in the appended claims.

In my U. S. Letters Patents 1,418,148 and 1,465,128 I have described apparatus for treating molten metal comprising a cylinder for holding the molten reagent superimposed on the melting pot containing the molten metal. It is inconvenient to have such a superimposed cylinder of large dimensions, so that if the amount of impurity to be removed per ton of metal is large, requiring a large quantity of the reagent, the latter has to be frequently renewed during the period occupied by the refining operation. While, therefore, the apparatus is satisfactory for most refining purposes, it is not so well adapted for the removal of large quantities of foreign material. Moreover, an overhead crane is practically essential for manipulating the cylinder.

According to the present invention the vessel for the molten reagent is separate from the melting pot and adjacent thereto and is sealed at the bottom by a suitable overflow pipe so that there is always in the vessel a quantity of molten metal upon which the molten reagent floats. The melting pot may be at a lower level than this overflow pipe, in which case the metal returns from the reagent vessel directly to the melting pot and is pumped or otherwise raised from the latter to the distributor at the top of the reagent vessel. Or the melting pot may be at a higher level than the reagent vessel, in which case the overflow from the latter discharges into a suitable sump and the metal is pumped or otherwise raised from this into the melting pot, whence it flows by gravity to the said distributor.

To avoid the use of additional motors or of gearing from the pump motor, I have provided a turbine driven by the circulating molten metal, and this turbine may be so located and constructed as to be used for various purposes. It is convenient to construct the molten metal distributor as a turbine driven by the molten metal passing through it and to cause this turbine to drive a stirring shaft in the reagent vessel and, where such is required, a device for feeding an additional reagent on to the surface of the molten reagent; any of these devices may, however, be independently driven.

The accompanying drawing shows partly in sectional elevation and by way of illustration, a preferred form of apparatus according to the invention designed for refining molten lead.

In this case the melting pot *a* is at a lower level than the reagent vessel *b*. The overflow pipe *c* is constructed as a trap to retain a sufficient quantity of molten lead in the vessel it discharges into the melting pot.

The bottom of the reagent vessel is formed as a well $d$ which is surrounded by a casing $e$ adapted to contain a gas burner (not shown) for heating the well.

The pump $f$ lifts the lead to the distributor $g$ which is shown in the form of a flared annular pipe having a correspondingly shaped inner hollow member $g^1$ forming with the outer pipe a flaring annular passage discharging through the blades of a turbine $h$ secured to a suitable disk or spider $g^2$ keyed to the shaft $i$. The shaft $i$ of this turbine turns in a step bearing in the lower part of the vessel $b$ and carries stirring arms $k$. In the case shown the shaft is extended upwards through the inner member $g^1$ to turn also in a bearing $l$, and drives through pulleys and belt $m$ or other gearing the shaft $n$ of a disc $o$. The latter receives from a feeding opening in the bottom of a container $p$ a stream of crushed solid reagent and by means of an adjacent stationary wiper (not shown) located above the disk discharges it on to the surface of the molten reagent in vessel $b$. This device thus provides means for automatically and gradually feeding to the reagent container a measured quantity of any desired reagent material at a predetermined rate during the reaction period.

The well $d$ being heated and the melting pot $a$ containing the molten lead to be refined, the pump $f$ is driven by its motor $q$ and the well and lower part of the vessel $b$ are thus charged with the metal; the reagent, say caustic soda, may then be charged into the vessel $p$ in molten state and the container $p$ may be filled with crushed solid reagent, say sodium nitrate. The circulation of the lead is continued until the desired degree of refining has been attained by the reactions in the reagent container, or until the reagent has become exhausted. The discharge of the molten metal between the inner blades of the turbine effectively distributes the metal in the reagent container so that it will pass into the molten reagent in distributed form, thus greatly facilitating the reactions. While the turbine is shown as driving the stirrer $k$ and the reagent feeder $o$, it will be understood that it may be used to perform any one or more of the functions it is here shown as performing, or it may be used for any other desired purpose in connection with the operations. Due to the specific gravity of the molten metal, the molten metal driven turbine provides a substantial and convenient source of power at little initial cost, and when positioned as shown it utilizes only what would be wasted energy.

Suitably closed outlets at $r$ and $r'$ permit the withdrawal of spent reagent from vessel $b$, and another at $s$ permits the withdrawal of lead from the well $d$.

An opening at $t$ in pipe $c$ serves for insertion of a pyrometer. The delivery end of pipe $c$ has small branch pipes $x$ only one of which is shown; these pipes are at different levels in the pot $a$ and the metal issuing from them creates a mixing movement in the main body of the metal in the pot.

When the circulation of the lead is rapid, sufficient heat for keeping the reagent melted may be conveyed by the lead from the melting pot furnace. When this is not desirable the vessel $b$ may be jacketed and heated by the waste heat from the melting pot furnace in manner similar to that described in my said Patent 1,465,128.

While I have described my invention in detail and in accordance with the preferred embodiment thereof for refining molten lead, it will be obvious to those skilled in the art, after having understood the invention, that for different uses of the invention certain parts of the apparatus may be used without other parts, and that various changes in the arrangement, construction and embodiment of the different features of the invention may be made without departing from the spirit or scope of the invention, and I aim in the appended claims to cover all modifications within the scope of the invention.

Having thus described the nature of the said invention and the best means I know of carrying the same into practical effect, I claim:—

1. In apparatus for treating molten metal, the combination of a pot for the molten metal, a stationary container for molten reagent located at one side of the pot and having a well at its lower end for containing a sufficient quantity of molten metal to seal the lower end of the continer, means for conveying the metal from the pot to the container, and a discharge pipe extending upwardly from the well a sufficient height to maintain the desired depth of molten metal for sealing the lower end of the container.

2. In apparatus for treating molten metal, the combination of a pot for the molten metal, a stationary container for molten reagent located at one side of the pot and having a well at its lower end for containing a sufficient quantity of molten metal to seal the lower end of the container, means for conveying the metal from the pot to the container, closed discharge openings at the lower end of the container and at the lower end of the well through which the spent reagent and molten metal may respectively be discharged, and a discharge pipe extending upwardly from the well a sufficient height to maintain the desired depth of molten metal for sealing the lower end of the container and thence discharging into the pot.

3. In apparatus for treating molten metal, the combination of a pot for the molten metal, a stationary container for molten reagent located at one side of the pot and having a well at its lower end for containing a sufficient quantity of molten metal to seal the lower end of the container, means for conveying the metal from the pot to the container, closed discharge openings at the lower end of the container and at the lower end of the well through which the spent reagent and molten metal may respectively be discharged, and a discharge pipe extending upwardly from the well a sufficient height to maintain the desired depth of molten metal for sealing the lower end of the container and thence extending into the pot and terminating in one or more dscharge openings of reduced area so located in the pot as to cause the discharged metal to maintain the body of metal in the pot agitated.

4. In apparatus for treating molten metal, a container for the molten metal, a container for molten reagent, a pipe through which the molten metal flows from one container to the other, and a turbine through which the molten metal is passed to drive the turbine.

5. In apparatus for treating molten metal, a container for a reagent, a turbine at the upper portion of the container, and means for conveying molten metal to the turbine through which the molten metal is passed to drive the turbine.

6. In apparatus for treating molten metal, a container for a reagent, a turbine in the upper portion of the container, and means for conveying molten metal to the turbine through which the molten metal is passed and discharged therefrom so as to be distributed in the container above the reagent.

7. In apparatus for treating molten metal, a container for a reagent, a turbine at the upper portion of the container, means for conveying molten metal to the turbine through which the molten metal is passed to drive the turbine, and a stirrer in the container driven by the turbine.

8. In apparatus for treating molten metal, a container for a reagent, a turbine at the upper portion of the container, means for conveying molten metal to the turbine through which the molten metal is passed to drive the turbine, and a stirrer in the container having a shaft to which the rotor of the turbine is secured to drive the stirrer.

9. In apparatus for treating molten metal, a container for a reagent, a turbine at the upper portion of the container, means for conveying molten metal to the turbine comprising inner and outer upright hollow members between which the molten metal flows to the rotor of the turbine, and a stirrer in the container having a shaft extending upwardly through said inner hollow member, to which shaft the rotor of the turbine is secured to drive the stirrer.

10. In apparatus for treating molten metal, a container for a reagent, a turbine at the upper portion of the container, means for conveying molten metal to the turbine comprising inner and outer upright hollow members between which the molten metal flows to the rotor of the turbine, a stirrer in the container having a shaft extending upwardly through said inner hollow member, to which shaft the rotor of the turbine is secured to drive the stirrer, and bearings for said shaft above and below the turbine.

11. In apparatus for treating molten metal, the combination of a pot for the molten metal, a container for a reagent, means for conveying the molten metal from the pot to the container, and means for gradually feeding a reagent to the container during the reaction period.

12. In apparatus for treating molten metal, the combination of a pot for the molten metal, a container for a reagent, means for conveying the molten metal from the pot to the container, a receptacle for a reagent to be fed to the reagent container during the reaction period, and means operatively related to said receptacle for feeding the reagent to the container.

13. In apparatus for treating molten metal, the combination of a pot for the molten metal, a container for a reagent, means for conveying the molten metal from the pot to the container, and means for automatically feeding a predetermined quantity of a reagent into the container during the reaction period.

14. In apparatus for treating molten metal, the combination of a pot for the molten metal, a container for a reagent, means for conveying the molten metal from the pot to the container, a receptacle for a reagent to be fed to the reagent container during the reaction period, and means comprising a rotatable member operatively related to said receptacle for gradually feeding the added reagent from the receptacle to the reagent container.

15. In apparatus for treating molten metal, a container for a reagent, a turbine at the upper portion of the container, means for conveying molten metal to the turbine through which the molten metal is passed to drive the turbine, a receptacle for a reagent to be fed to the reagent container during the reaction period, means comprising a rotatable member operatively related to the receptacle for feeding the reagent from the receptacle to the container, and means for driving said rotatable member from the turbine.

16. In apparatus for treating molten metal, a container for a reagent, a turbine in the upper portion of the container, means for conveying molten metal to the turbine through which the molten metal is passed and discharged therefrom so as to be distributed in the container above the reagent, a receptacle for a reagent to be fed to the reagent container during the reaction period, means comprising a rotatable member operatively related to the receptacle for gradually feeding the reagent from the receptacle to the container, and means for driving said rotatable member from the turbine.

In testimony whereof I have signed my name to this specification.

HENRY HARRIS.